United States Patent Office 2,758,142
Patented Aug. 7, 1956

2,758,142
HYDROCARBON PURIFICATION

Jacob D. Kemp, El Cerrito, Calif., assignor to California Research Corporation, San Francisco, Calif., a corporation of Delaware No Drawing. Application December 30, 1954, Serial No. 478,890

4 Claims. (Cl. 260—676)

This invention relates to a process for effecting the essentially quantitative removal of lower dialkyl sulfates contained in a normally liquid aliphatic hydrocarbon.

Hydrocarbons contaminated by the presence of even small proportions of dialkyl sulfates have proved extremely difficult to handle in chemical processes occurring at elevated temperatures. The equipment used to conduct such high-temperature processes is observed to undergo rapid and severe corrosion and deterioration, leading to high costs of maintenance and replacement. It is believed that in subjecting such hydrocarbons to increased temperatures the contained dialkyl sulfates are decomposed into acidic materials which attack and corrode the process equipment.

This problem is well illustrated by the difficulties encountered in the fractional distillation of hydrocarbons produced by acid treating of naphthas or by alkylating a lower olefin with a lower isoparaffin, using sulfuric acid as the catalyst in each instance, to separate a fraction boiling in the gasoline range.

Dialkyl sulfates which are produced in varying amounts in these processes are retained in minor proportions in the hydrocarbon products and are subsequently decomposed to acidic materials during distillation, thereby resulting in serious fouling and corrosion of the distillation equipment and adding materially to the expense of processing.

It is the object of this invention to provide a method whereby essentially quantitative removal of contaminating dialkyl sulfates may be effected from hydrocarbon stock with the consequence that the hydrocarbon may be subjected to chemical processing at elevated temperatures, such as fractional distillation, without the formation of injurious acidic materials which attack and corrode the equipment used.

This result is achieved pursuant to the present invention by intimately contacting the hydrocarbon stock with an isoparaffin, preferably isobutane, in the presence of relatively small amounts of concentrated sulfuric acid. Such contact can be accomplished by mechanical stirring, shaking of the containing vessel, etc. This reaction may be carried out over the temperature range of 30–150° F., although a temperature within the range of 40–60° F. is preferred. A pressure is maintained sufficient to keep all reactants in a liquid phase. By this method it has been found that more than 99% of the contaminating dialkyl sulfates may be removed from the hydrocarbon; distillation of the hydrocarbons after such treatment results in little or no fouling or corrosion of the apparatus. It has also been observed that less than 5% of the removed dialkyl sulfate is retained in the acid phase, thereby permitting further usage of the acid in additional dialkyl sulfate removal or in the alkylation contact reactors.

Example I

To 8.1 molar parts (816 grams) of n-heptane containing 64 p. p. m. of sulfur as dialkyl sulfate were added 0.9 molar part (84.7 grams) of concentrated sulfuric acid and 10.5 molar parts (613 grams) of isobutane. The mixture was thoroughly agitated for one minute and then allowed to settle. Following removal of the isobutane, the n-heptane was found to have a sulfur content of 2.5 p. p. m.—representing a removal of 96% of the original sulfur. This n-heptane was distilled without observable corrosion of apparatus.

Example II

To 1.4 molar parts (135 grams) of n-heptane containing 127 p. p. m. of sulfur as dialkyl sulfate were added 3.6 molar parts (354 grams) of concentrated sulfuric acid and 7.1 molar parts (414 grams) of isobutane. The mixture was thoroughly agitated for one minute and then allowed to settle. Following removal of the isobutane, the n-heptane was found to have a sulfur content of 3 p. p. m.—representing a removal of 98% of the original sulfur. This n-heptane was distilled without observable corrosion of apparatus.

Example III

To 2 molar parts (231 grams, average molecular weight 114) of an alkylate gasoline produced by alkylating lower olefins with lower isoparaffins and containing 10,300 p. p. m. of sulfur as dialkyl sulfate were added 1.7 molar parts (164 grams) of concentrated sulfuric acid and 6.8 molar parts (395 grams) of isobutane. The mixture was thoroughly agitated for two minutes and then allowed to settle. Following removal of the isobutane, the alkylate was found to have a sulfur content of 6 p. p. m.—representing a removal of 99.94% of the original sulfur. No corrosion was observed during extended distillation of alkylate so treated.

Example IV

To 7.1 molar parts (817 grams, average molecular weight 114) of an alkylate gasoline produced by alkylating lower olefins with lower isoparaffins and containing 75 p. p. m. of sulfur as dialkyl sulfate were added 8.9 molar parts of concentrated sulfuric acid and 9.5 molar parts (550 grams) of isobutane. The mixture was thoroughly agitated for two minutes and allowed to settle. Following removal of the isobutane, the alkylate was found to contain 3 p. p. m. of sulfur—representing a removal of 96% of the original sulfur. Extended distillation of alkylate so treated produced negligible corrosion.

Example V

When Example IV is repeated, substituting isopentane for isobutane on a mol for mol basis, substantially the same degree of sulfate removal is accomplished.

Although the use of isobutane or isopentane is preferred in the present invention, dialkyl sulfate removal may also be effected by the use of other lower isoparaffins or mixtures of such isoparaffins.

The volume ratio of acid to hydrocarbon in the contacting zone may be varied from .1 to 9, but is preferably maintained at about 1. The molar ratio of the isoparaffin to the hydrocarbon may be varied from .5 to 20.

I claim:

1. A process for treating normally liquid aliphatic hydrocarbons containing 0.01% to 1% by weight of lower dialkyl sulfates to remove the dialkyl sulfates, which comprises intimately contacting, at a temperature of from about 30° to 150° F. and a pressure sufficient to maintain the reactants in liquid phase, the aliphatic hydrocarbons with concentrated sulfuric acid and an isoparaffin, said contacting operation being conducted at a volume ratio of acid to aliphatic hydrocarbon of from 0.1 to 9.0 and a molar ratio of isoparaffin to aliphatic hydrocarbon of from 0.5 to 20.0.

2. The process of claim 1, wherein the isoparaffin is isobutane.

3. The process of claim 1, wherein the isoparaffin is isopentane.

4. In a distillation of aliphatic hydrocarbons containing 0.01% to 1% by weight of dialkyl sulfates, the improved method of preventing apparatus fouling and corrosion which comprises intimately contacting, at a temperature of from about 30° to 150° F. and a pressure sufficient to maintain the reactants in liquid phase, the aliphatic hydrocarbon with concentrated sulfuric acid and an isoparaffin prior to distillation, said contacting operation being conducted at a volume ratio of acid to aliphatic hydrocarbon of from 0.1 to 9.0 and a molar ratio of isoparaffin to aliphatic hydrocarbon of from 0.5 to 20.0.

References Cited in the file of this patent

UNITED STATES PATENTS 2,404,661    Sanderson _____ July 23, 1946

OTHER REFERENCES

Caesar et al.: Industrial and Engineering Chemistry, vol. 33, No. 11, November 1941, pages 1426–1428.